(12) United States Patent
Kubota

(10) Patent No.: US 7,674,738 B2
(45) Date of Patent: Mar. 9, 2010

(54) TRANSLUCENT CERAMIC AND ELECTRO-OPTICAL COMPONENT

(75) Inventor: Teppei Kubota, Kusatsu (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 12/274,441

(22) Filed: Nov. 20, 2008

(65) Prior Publication Data

US 2009/0062107 A1 Mar. 5, 2009

Related U.S. Application Data

(63) Continuation of application No. PCT/JP2007/060815, filed on May 28, 2007.

(30) Foreign Application Priority Data

May 31, 2006 (JP) ............................. 2006-152339

(51) Int. Cl.
C04B 35/495 (2006.01)

(52) U.S. Cl. .................................................... 501/135

(58) Field of Classification Search ................. 501/134, 501/135
See application file for complete search history.

(56) References Cited

U.S. PATENT DOCUMENTS

| | | | | |
|---|---|---|---|---|
| 3,640,865 | A * | 2/1972 | Burns et al. | 252/62.9 R |
| 4,752,594 | A * | 6/1988 | Hyuga et al. | 501/135 |
| 6,403,053 | B1 * | 6/2002 | Fang et al. | 423/594.8 |
| 6,903,053 | B2 * | 6/2005 | Noda et al. | 504/360 |
| 6,903,495 | B2 * | 6/2005 | Akimune et al. | 310/358 |
| 7,393,803 | B2 * | 7/2008 | Takeda et al. | 501/135 |
| 7,396,790 | B2 * | 7/2008 | Kuretake et al. | 501/135 |

FOREIGN PATENT DOCUMENTS

| | | |
|---|---|---|
| JP | 62171957 | 7/1987 |
| JP | 63291844 | 11/1988 |
| JP | 09-208394 | 8/1997 |
| JP | 10/297969 | 10/1998 |
| JP | 11278932 | 10/1999 |
| JP | 11278932 | 12/1999 |
| WO | 2006114953 | * 11/2006 |

OTHER PUBLICATIONS

JP 63291844, Derwent abstract, Nov. 29, 1988.*
JP 62171957, Derwent abstract, Jul. 28, 1987.*
Murty, S. Narayana; Raju, S. Bangar; Bhanumathi, A, Padmavathi, G., Murty, K. Linga. "Microstructural Studies of Modified SBN Ceramics". ISAF'94, Proceedings of the IEEE International Symposium on Applications of Ferroelectrics, 9th, University Park, Pa., 1994, p. 269-272.
International Search Report for PCT/JP2007/060815 dated Apr. 9, 2007.

* cited by examiner

*Primary Examiner*—Karl E Group
(74) *Attorney, Agent, or Firm*—Dickstein Shapiro LLP

(57) ABSTRACT

A translucent ceramic contains a main component composed of a tungsten-bronze-type compound represented by a general formula $\{(Sr, Ba)Nb_vO_w\}$ (wherein v satisfies the relationship $1.8 \leq v \leq 2.2$ and w represents a positive number for maintaining electrical neutrality), wherein some Nb atoms are replaced with atoms of at least one of Zn and Mg, and the replacement ratio is 0.004 or more in terms of the molar ratio. It is preferable that at least one of Sn and Bi is added in an amount of 0.15 parts by weight or more in terms of $SnO_2$ and $Bi_2O_3$, respectively, to 100 parts by weight of the main component, and that the molar ratio of Ba in the (Sr, Ba) site is in the range of 0.25 to 0.50. It is also preferable that the translucent ceramic contains Na in an amount of less than 25 parts by mole relative to 100 parts by mole of the sum of Sr and Ba, or La in an amount of less than 11 moles relative to 100 parts by mole of the sum of Sr and Ba. Accordingly, a translucent ceramic which is inexpensive and which is useful as an electro-optical material and an electro-optical component, such as an optical switch or an optical shutter, including the translucent ceramic can be realized.

18 Claims, 4 Drawing Sheets

TRANSLUCENT CERAMIC AND ELECTRO-OPTICAL COMPONENT

This is a continuation of application Serial No. PCT/JP2007/060815, filed May 28, 2008.

TECHNICAL FIELD

The present invention relates to a translucent ceramic and an electro-optical component, and in particular, to a translucent ceramic useful as an electro-optical material, and an electro-optical component, such as an optical switch or an optical shutter, including the same.

BACKGROUND ART

When an electric field is applied to a certain type of electro-optical material having ferroelectricity and translucency, the refractive index is changed to generate an electro-optical effect. Therefore, such an electro-optical material has been expected to be used as an optical component such as an optical switch or an optical shutter.

Hitherto, a translucent single crystal of $LiTaO_3$, $(Sr, Ba)Nb_2O_6$, or the like has been widely used as such an electro-optical material. However, single crystals are disadvantageous in that the production cost is high, and that it is difficult to obtain materials having a large size.

Accordingly, use of a translucent polycrystalline ceramic has recently, been studied. Such a translucent polycrystalline ceramic (hereinafter, the term "translucent ceramic" used in this description means a translucent polycrystalline ceramic) is obtained by compacting a raw material powder, sintering the resulting compact, and polishing the sintered compact. Therefore, the production cost can be lower than that in a case of a single crystal. (Pb, La) (Ti, Zr)$O_3$ (hereinafter referred to as "PLZT") is known as a typical example of such a translucent ceramic. In this PLZT, some Pb atoms of Pb(Ti, Zr) $O_3$, which is a ferroelectric material, are replaced with La atoms, thereby somewhat decreasing ferroelectricity, and translucency is provided by further performing hot-pressing or the like.

However, PLZT contains lead, and thus the use of PLZT is not preferable from an environmental viewpoint. Furthermore, PLZT is disadvantageous in its optical characteristics become unstable because of volatilization of lead.

Consequently, strontium barium niobate ((Sr, Ba)$Nb_2O_6$) translucent ceramics which have a tungsten bronze structure have been actively developed as a lead-free electro-optical material.

For example, Patent Document 1 proposes a method of producing a translucent sintered compact including preparing a mixed solution of aqueous solutions of oxalates of Sr, Ba, and Nb, the mixed solution having a composition ratio represented by a general formula $Sr_{1-x}Ba_xNb_2O_6$ (wherein $0.25 \leq x \leq 0.75$), allowing ammonia to interact with the mixed aqueous solution to produce a precipitate, thermally decomposing the precipitate, compacting the resulting product, and sintering the resulting compact in an oxygen atmosphere.

Furthermore, Patent Document 2 proposes a method of producing a sintered compact of (Sr, Ba)$Nb_2O_6$ including preparing a mixed solution containing Nb, Sr, and Ba, performing a hydrolysis reaction to produce a sol, drying the sol, calcining the dried sol at 800° C. to 1,400° C., mixing the resulting calcined product with a Nb compound, calcining again the mixture at 800° C. to 1,400° C. to prepare a calcined powder, compacting the calcined powder, and sintering the compact at 1,100° C. to 1,400° C.

Patent Document 1: Japanese Unexamined Patent Application Publication No. 62-171957

Patent Document 2: Japanese Unexamined Patent Application Publication No. 63-291844

DISCLOSURE OF INVENTION

Problems to be Solved by the Invention

According to the methods disclosed in Patent Documents 1 and 2, a mixed solution of compounds containing the constituent elements of the ceramic is prepared in the production process of a translucent ceramic, and the translucent ceramic is obtained from the mixed solution.

However, the method in which a raw material powder before sintering is prepared by a wet method is disadvantageous in that the step of preparing the raw material powder inevitably becomes complex and that the mass productivity of the method is low.

In addition, it is difficult to stabilize the molar ratio of the constituent elements in such a wet method, and thus, destabilization of optical characteristics is easily caused. Accordingly, such a method is disadvantageous in that it is difficult to obtain a translucent ceramic having desired stable optical characteristics.

The present invention has been conceived in view of the above situation, and an object of the present invention is to provide a strontium barium niobate translucent ceramic which is inexpensive and which is useful as an electro-optical material, and an electro-optical component including the same.

Means for Solving the Problems

In order to achieve the above object, a translucent ceramic according to the present invention contains a main component composed of a tungsten-bronze-type compound represented by a general formula $\{(Sr, Ba)Nb_vO_w\}$ (wherein v satisfies the relationship $1.8 \leq v \leq 2.2$ and w represents a positive number for maintaining electrical neutrality), wherein some Nb atoms are replaced with atoms of at least one element M selected from Zn and Mg, and the replacement ratio is 0.004 or more in terms of the molar ratio (M:Nb).

In addition, the translucent ceramic of the present invention further contains at least one of Sn and Bi in an amount of 0.15 parts by weight or more in terms of $SnO_2$ and $Bi_2O_3$, respectively, relative to 100 parts by weight of the main component.

Furthermore, in the translucent ceramic of the present invention, the molar ratio of Ba in the (Sr, Ba) site is in the range of 0.25 to 0.50.

In addition, the translucent ceramic of the present invention contains Na in an amount of less than 25 parts by mole relative to 100 parts by mole of the sum of Sr and Ba.

Furthermore, the translucent ceramic of the present invention contains La in an amount of less than 11 parts by mole relative to 100 parts by mole of the sum of Sr and Ba.

In addition, an electro-optical component according to the present invention includes the above-described translucent ceramic.

Advantages

A translucent ceramic of the present invention contains a main component composed of a tungsten-bronze-type compound represented by a general formula $\{(Sr, Ba)Nb_vO_w\}$ (wherein v satisfies the relationship $1.8 \leq v \leq 2.2$ and w represents a positive number for maintaining electrical neutrality), wherein some Nb atoms are replaced with atoms of at least one element M selected from Zn and Mg, and the replacement molar ratio is 0.004. Accordingly, a translucent ceramic which is useful as an electro-optical material having desired optical characteristics according to need can be easily obtained.

In addition, the translucent ceramic of the present invention contains at least one of Sn and Bi in an amount of 0.15 parts by weight or more in terms of $SnO_2$ and $Bi_2O_3$, respectively, relative to 100 parts by weight of the main component. Accordingly, a translucent ceramic having further improved translucency can be obtained.

In addition, the molar ratio of Ba in the (Sr, Ba) site is in the range of 0.25 to 0.50. Accordingly, a translucent ceramic having stable optical characteristics can be reliably obtained.

In addition, by adding Na in an amount of less than 25 parts by mole relative to 100 parts by mole of the sum of Sr and Ba, the ferroelectricity can be somewhat increased, and thus, the electro-optical characteristics can be properly controlled. Consequently, a translucent ceramic suitable for a desired application can be obtained.

In addition, by adding La in an amount of less than 11 parts by mole relative to 100 parts by mole of the sum of Sr and Ba, the ferroelectricity can be somewhat decreased, and thus, the electro-optical characteristics can be properly controlled. Consequently, a translucent ceramic suitable for a desired application can be obtained.

In addition, an electro-optical component of the present invention includes the above-described translucent ceramic. Accordingly, an electro-optical component having a stable electro-optical effect can be obtained at low cost.

Figure 1:
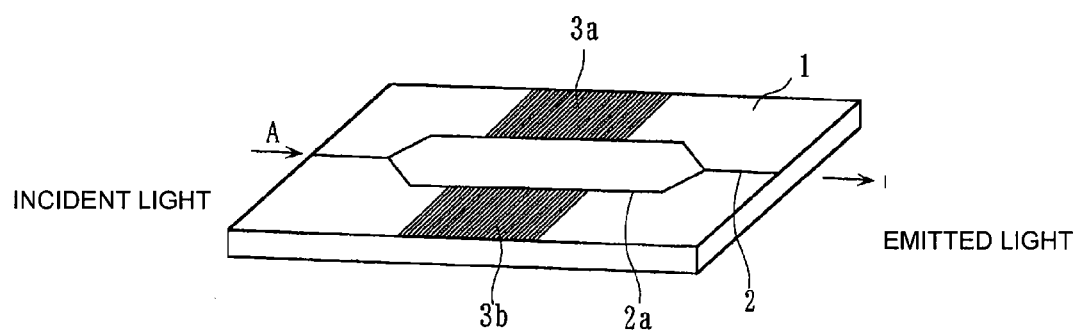
FIG. 1 is a perspective view showing an embodiment of an optical switch which is an electro-optical component including a translucent ceramic of the present invention.

REFERENCE NUMERAL 1 ceramic substrate (translucent ceramic)

BEST MODES FOR CARRYING OUT THE INVENTION

Next, embodiments of the present invention will be described in detail.

A translucent ceramic according to an embodiment of the present invention contains a main component composed of a tungsten-bronze-type compound represented by general formula (A):

$$(Sr_{1-x}Ba_x)(Nb_{1-y}M_y)_vO_w \qquad (A)$$

Here, v is adjusted to be in the range of 1.8 to 2.2 so as to be a value of about 2, and w is adjusted to be about 6 so that the main component maintains electrical neutrality.

In addition, the amounts of Sr and Ba in the composition are adjusted so that x is preferably in the range of 0.25 to 0.50.

More specifically, x represents the molar ratio of Ba of the (Sr, Ba) site, and the range thereof is not particularly limited as long as a satisfactory electro-optical effect can be obtained. However, when the molar ratio x is within the range of 0.25 to 0.50, translucency can be reliably ensured, and a desired electro-optical effect can be obtained. Accordingly, the amounts of Sr and Ba in the composition are adjusted in this embodiment, so that the molar ratio x is preferably in the range of 0.25 to 0.50.

Furthermore, element M is at least one element selected from Zn and Mg, and the amounts of Nb and element M in the composition are adjusted so that the molar ratio y is 0.004 or more.

By replacing some Nb atoms with at least one element M selected from Zn and Mg, the formation of a different phase due to an orthorhombic crystal is suppressed, and a single-phase formation of a tetragonal crystal which is a main crystal phase can be accelerated, thereby ensuring translucency.

However, when the molar ratio y, which represents the replacement ratio of element M to Nb, is less than 0.004, the molar content of element M in the Nb site is excessively small. Accordingly, the replacement effect due to element M cannot be achieved. That is, an orthorhombic system, which is a different phase than a tetragonal crystal is formed in the crystal phase. Consequently, a desired translucency cannot be obtained, and in addition, sinterability may be degraded.

Therefore, the amounts of components in the composition in this embodiment, are adjusted so that the molar ratio y is at least 0.004 or more.

The upper limit of the molar ratio y is not particularly limited. As the molar ratio y increases, the transparency can improve. However, when the molar ratio y exceeds 0.016, abnormal grain growth of crystal grains may occur. Accordingly, the molar ratio y is preferably 0.016 or less from the standpoint of suppressing abnormal grain growth of crystal grains.

Element M replaces some Nb atoms in a molar ratio y in the range of 0.004 or more, and is present in the form of a solid solution in the Nb site. However, a small amount of element M may be present in the form of a solid solution in the Sr site, or may be present at a crystal grain boundary or a crystal triple point as long as element M does not affect the desired optical characteristics of the translucent ceramic.

As described above, the main component of the translucent ceramic of this embodiment is represented by general formula (A) (wherein $1.8 \leq v \leq 2.2$, $w \approx 6$, and $y \geq 0.004$). Accordingly, the formation of a different phase in the crystal phase is suppressed to accelerate the single-phase formation of a tetragonal crystal, and thus translucency can be ensured. In particular, where the molar ratio y is 0.016 or less, the occurrence of abnormal grain growth of crystal grains can also be suppressed.

Furthermore, the above operation and advantage can be reliably achieved by adjusting the molar ratio x to be in the range of 0.25 to 0.50.

The above-described translucent ceramic can be preferably produced by a method described below.

First, a raw material powder whose crystal phase is composed of a tetragonal crystal single phase is prepared by using a solid-phase method. More specifically, a Sr compound, a Ba compound, a Nb compound, and in addition, at least one compound selected from a Zn compound and a Mg compound are prepared as ceramic raw materials used as starting raw materials. The types of compounds may be any of oxides, hydroxides, carbonates, and the like.

Next, predetermined amounts of ceramic raw materials prepared above are weighed, mixed in a solvent such as purified water, and the resulting mixture is dried. Synthesis is performed by a heat treatment, and thus, a calcined powder represented by general formula (A) described above (wherein $1.8 \leqq v \leqq 2.2$, $w \approx 6$, $y \geqq 0.004$, and x preferably satisfies the relationship $0.25 \leqq x \leqq 0.50$) is obtained.

Next, a forming process such as press forming is performed using the calcined powder to prepare a ceramic compact. It is also preferable that isostatic pressing is applied to the pressed compact after the press forming, and the resulting compact is used as a ceramic compact before sintering. By applying isostatic pressing to a pressed compact in this manner, the compactness can be improved after sintering, and thus a ceramic sintered compact having more satisfactory uniformity can be obtained.

Next, the ceramic compact is sintered at a maximum temperature in the range of 1,300° C. to 1,500° C. in an oxygen atmosphere with an oxygen concentration of 90% or more for a predetermined period of time. Thereby, a ceramic sintered compact with high compactness can be obtained.

During the sintering process, the ceramic compact may be embedded in a ceramic powder having substantially the same composition as the ceramic compact or the ceramic compact may be brought into contact with a sintered compact having substantially the same composition as the ceramic compact. In such a case, the compactness is further improved, and it is effective to improve the transparency and to suppress scattering. Herein, the term "substantially the same composition" does not necessarily mean the same composition, but means that, for example, such a ceramic powder or a sintered ceramic compact must contain Sr, Ba, and Nb because these are the main components of a tungsten-bronze-type compound, but may not necessarily contain other elements (e.g., Mg and Zn) which are contained in small amounts in the above-described ceramic compact.

Next, the ceramic sintered compact is cut and ground so as to have a predetermined size. Furthermore, the surface of the resulting sintered compact is smoothed by performing grinding and polishing processes on the surface thereof so as to have a predetermined thickness. Thereby, a translucent ceramic functioning as an electro-optical material is produced.

As described above, the above translucent ceramic can be produced by a solid-phase method. Accordingly, unlike the wet method, the production process is not complex, and a desired translucent ceramic can be relatively easily obtained. Furthermore, ceramic raw materials corresponding to the final composition are weighed, and a solid-phase method is employed in producing the translucent ceramic. Therefore, a "deviation of composition", which may occur in the wet method, can be suppressed, and a translucent ceramic having a desired composition can be produced with high efficiency.

The present invention is not limited to the embodiment described above. In the above embodiment, a Mg compound and/or a Zn compound is weighed in the same step of weighing a Sr compound and the like, the compounds are mixed to prepare a calcined powder, and a forming process is then performed. Alternatively, first, a Sr compound, a Ba compound, and a Nb compound may be mixed, and the resulting mixture may be calcined to prepare a calcined powder. Subsequently, a Mg compound and/or a Zn compound may be added to and mixed with the calcined powder, a heat treatment or the like may be performed, and a forming process may then be performed.

Furthermore, by adding various types of additional components to the main component or replacing some atoms of a constituent element of the main component with atoms of another element in the present invention, the electro-optical effect can be appropriately controlled or the transparency can be improved.

For example, it is also preferable that at least one of Sn and Bi is added to the main component. Since Sn and Bi accelerate the growth of crystal grains, the generation of structural defects such as voids in the ceramic can be suppressed, and thus, the transparency can be further improved.

However, in order to exhibit a desired effect of addition in this case, it is necessary that 0.15 parts by weight or more of at least one of Sn and Bi be added to 100 parts by weight of the main component in terms of $SnO_2$ and $Bi_2O_3$, respectively. That is, when the content of at least one of Sn and Bi is less than 0.15 parts by weight relative to 100 parts by weight of the main component, the content of at least one of Sn or Bi is excessively low. Therefore, even if these elements are added to the main component, they do not contribute to the acceleration of the growth of crystal grains, and the desired effect of addition cannot be exhibited. Accordingly, it is preferable in the case where at least one of Sn and Bi is added that 0.15 parts by weight or more of at least one of Sn and Bi is added to 100 parts by weight of the main component in terms of $SnO_2$ and $Bi_2O_3$, respectively.

On the other hand, addition of 0.58 parts by weight or more of at least one of Sn and Bi in terms of $SnO_2$ and $Bi_2O_3$, respectively, to 100 parts by weight of the main component is not preferable because the growth of crystal grains is excessively accelerated, which may result in abnormal grain growth. Accordingly, even when at least one of Sn and Bi is added, the content thereof is preferably less than 0.58 parts by weight relative to 100 parts by weight of the main component in terms of $SnO_2$ and $Bi_2O_3$, respectively.

The form of at least one of Sn and Bi in the ceramic is not particularly limited. These elements may be present in the form of a solid solution in either the (Sr, Ba) site or the Nb site or may be present at a crystal grain boundary or a crystal triple point as long as these elements do not affect the electro-optical characteristics.

In the production method of this case, at least one of a $SnO_2$ powder and a $Bi_2O_3$ powder is mixed with a calcined powder, a heat treatment is performed, and a step of forming and a step of sintering which are similar to those described above, are then performed. Thereby, the production can be easily performed by a sold-phase method. Alternatively, at least one of a $SnO_2$ powder and a $Bi_2O_3$ powder may be mixed together with ceramic raw materials composed of a Sr compound and the like in the initial stage, and the production may be performed by calcining the resulting mixture.

Furthermore, it is preferable in the present invention, that the main component contains Na. When the main component contains Na, ferroelectricity can be somewhat increased, and the electro-optical characteristics can be properly controlled. Consequently, a translucent ceramic suitable for a desired application can be obtained.

However, when the main component contains Na, it is necessary that the amount of Na be less than 25 parts by mole relative to 100 parts by mole of the sum of Sr and Ba. The reason for this is as follows. When the main component contains 25 parts by mole or more of Na relative to 100 parts by mole of the sum of Sr and Ba, the crystal phase is not composed of a single tetragonal crystal phase, but a different orthorhombic crystal phase is partly formed. As a result, the transparency is decreased.

In addition, it is also preferable in the present invention, that the main component contains La. When the main component contains La, the ferroelectricity can be somewhat decreased, and the electro-optical characteristics can be properly controlled. Consequently, a translucent ceramic suitable for a desired application can be obtained.

However, when the main component contains La, it is necessary that the amount of La be less than 11 parts by mole relative to 100 parts by mole of the sum of Sr and Ba. The reason for this is as follows. When the main component contains 11 parts by mole or more of La relative to 100 parts by mole of the sum of Sr and Ba, the crystal phase is not composed of a single tetragonal crystal phase, but a different orthorhombic crystal phase is partly formed. As a result, the transparency is decreased.

The ferroelectricity is an index of the electro-optical characteristics. The degree of ferroelectricity can be evaluated by measuring the axial ratio of the crystal axes in the crystal system by X-ray diffractometry. Alternatively, the evaluation can be performed by forming electrodes on principal surfaces of a translucent ceramic, applying an electric field to the electrodes, and observing a D-E hysteresis loop between dielectric displacement D and electric field E.

Sodium (Na) and lanthanum (La) are often present in the form of a solid solution in the (Sr, Ba) site. However, Na and La may be present at a crystal grain boundary or a crystal triple point as long as these elements do not affect the characteristics.

Furthermore, as described above, it is essential that, some Nb atoms in the Nb site, be replaced with either Mg atoms or Zn atoms. However, some Nb atoms may further be replaced with atoms of another element as long as a different phase is not formed in the crystal phase and the optical characteristics do not effected.

Next, an example of an electro-optical component including the above-described translucent ceramic will be described.

FIG. 1 is a perspective view showing an embodiment of a waveguide optical switch which is an electro-optical component according to the present invention.

In this optical switch, a waveguide 2 having a branched portion 2a is formed on a ceramic substrate 1 composed of a translucent ceramic of the present invention, and a pair of facing surface electrodes 3a and 3b are formed so as to sandwich the branched portion 2a.

When electric potentials of opposite polarities are applied to the surface electrodes 3a and 3b in the translucent ceramic having this structure, the phase difference of light incident from the direction shown by arrow A and passing through the branched portion 2a is changed. Consequently, the intensity of emitted light is changed, and the optical switch switches on and off.

Since the translucent ceramic of the present invention is used as the ceramic substrate 1, the optical switch can reliably allow light to pass. Consequently, exhibition of a stable electro-optical effect can be maintained to realize high performance optical switch.

Note that the waveguide optical switch described above is merely given as an example of an embodiment in which the translucent ceramic of the present invention is used as an electro-optical component. That is, it should be understood that the translucent ceramic of the present invention can be applied to not only the above-described waveguide optical switch but also various types of electro-optical components such as a light deflecting prism optical switch and an optical shutter including comb-shaped electrodes provided on either surface.

Next, Examples of the present invention will be specifically described.

Example 1

High-purity $SrCO_3$, $BaCO_3$, $Nb_2O_5$, $MgCO_3$, and ZnO were prepared as ceramic raw materials to be used as starting raw materials.

Subsequently, the ceramic raw materials were weighed so that the composition of a main component was $(Sr_{0.75}Ba_{0.25})(Nb_{1-y}M_y)_{1.90}O_w$ (wherein M represents Mg or Zn, y satisfies the relationship $0.000 \leq y \leq 0.030$, and w is about 6), and charged in a ball mill. The ceramic raw materials were then mixed by a wet method to prepare mixtures. Each of the mixtures was dried, and then calcined at a temperature of 1,200° C. for three hours to prepare calcined powders.

Next, purified water and an organic binder containing vinyl acetate were mixed with each of the resulting calcined powders. The resulting mixtures were then dried and granulated. Subsequently, the granulated products were press-formed by applying a pressure of 98 MPa to prepare rectangular pressed compacts each having a length of 9 mm, a width of 8 mm, and a thickness of 2 mm.

Next, the pressed compacts were heat-treated in an air atmosphere at a temperature of 600° C., thus performing a debinding process. Subsequently, isostatic pressing was performed at room temperature for one minute by applying a pressure of 600 MPa to prepare ceramic compacts.

Next, the ceramic compacts were charged in a sintering furnace, and oxygen was introduced in an air atmosphere while increasing the temperature so that the oxygen concentration was 95 volume percent at a temperature of 1,420° C. The sintering process was performed for 48 hours while maintaining a temperature of 1,420° C. and an oxygen concentration of 95 volume percent to prepare ceramic sintered compacts.

A lapping process was performed on the ceramic sintered compacts thus obtained using abrasive grains of #2,000, and a mirror polishing process was then further performed. Accordingly, sample Nos. 1 to 19 each having a thickness of 0.55 mm were obtained.

Next, the sintered state of the samples with sample Nos. 1 to 19 was observed with a scanning electron microscope.

Furthermore, the crystal structure of each sample was analyzed using an X-ray diffractometer, and identification of the crystal system and determination of the presence or absence of a different phase component were performed. In addition, each of the samples was irradiated with visible light having a wavelength of 900 nm using a spectrometer manufactured by Shimadzu Corporation to measure the linear transparency.

Table 1 shows the compositions and the measurement results of sample Nos. 1 to 19.

TABLE 1

| Sample No. | Main component: $(Sr_{0.75}Ba_{0.25})(Nb_{1-y}M_y)_{1.90}O_w$ | | | State of sintered compact | State of crystal phase | Linear transparency (%) |
|---|---|---|---|---|---|---|
| | M | y | | | | |
| 1* | — | 0.000 | | Sintering was insufficient. | In addition to a tetragonal crystal, a different phase of an orthorhombic crystal was also present. | 0.00 |
| 2 | Mg | 0.004 | | The uniformity was satisfactory. | Single phase of a tetragonal crystal | 0.13 |
| 3 | Mg | 0.008 | | The uniformity was satisfactory. | Single phase of a tetragonal crystal | 0.24 |
| 4 | Mg | 0.010 | | The uniformity was satisfactory. | Single phase of a tetragonal crystal | 0.27 |
| 5 | Mg | 0.012 | | The uniformity was satisfactory. | Single phase of a tetragonal crystal | 0.34 |
| 6 | Mg | 0.014 | | The uniformity was satisfactory. | Single phase of a tetragonal crystal | 0.33 |
| 7 | Mg | 0.016 | | The uniformity was satisfactory. | Single phase of a tetragonal crystal | 6.35 |
| 8 | Mg | 0.018 | | Abnormal grain growth was observed. | Single phase of a tetragonal crystal | 10.50 |
| 9 | Mg | 0.020 | | Abnormal grain growth was observed. | Single phase of a tetragonal crystal | 18.30 |
| 10 | Mg | 0.030 | | Abnormal grain growth was observed. | Single phase of a tetragonal crystal | 25.00 |
| 11 | Zn | 0.004 | | The uniformity was satisfactory. | Single phase of a tetragonal crystal | 1.40 |
| 12 | Zn | 0.008 | | The uniformity was satisfactory. | Single phase of a tetragonal crystal | 2.51 |
| 13 | Zn | 0.010 | | The uniformity was satisfactory. | Single phase of a tetragonal crystal | 2.79 |
| 14 | Zn | 0.012 | | The uniformity was satisfactory. | Single phase of a tetragonal crystal | 3.56 |
| 15 | Zn | 0.014 | | The uniformity was satisfactory. | Single phase of a tetragonal crystal | 3.45 |
| 16 | Zn | 0.016 | | The uniformity was satisfactory. | Single phase of a tetragonal crystal | 8.25 |
| 17 | Zn | 0.018 | | Abnormal grain growth was observed. | Single phase of a tetragonal crystal | 13.60 |
| 18 | Zn | 0.020 | | Abnormal grain growth was observed. | Single phase of a tetragonal crystal | 23.80 |
| 19 | Zn | 0.030 | | Abnormal grain growth was observed. | Single phase of a tetragonal crystal | 32.50 |

The sample marked with symbol * is out of the range of the present invention.

The composition of the main component of sample No. 1 was $(Sr_{0.75}Ba_{0.25})Nb_{1.90}O_w$. That is, the Nb site was composed of only Nb, and contained neither Zn nor Mg. Accordingly, sinterability was poor, and the sintering was insufficient at a sintering temperature of 1,420° C. Furthermore, the presence of an orthorhombic crystal phase in addition to a tetragonal crystal, was observed. Therefore, translucency was not exhibited, and the linear transparency was "zero".

In contrast, some Nb atoms in sample Nos. 2 to 19, were replaced with Mg or Zn atoms within the range of 0.004 to 0.030 in terms of the molar ratio. Accordingly, the crystal phase was composed of a single tetragonal crystal phase, and no different phase was observed. Furthermore, a linear transparency of 0.13% or more could be obtained, and thus, it was confirmed that translucency could be ensured.

As shown in sample Nos. 2 to 7 and sample Nos. 11 to 16, the uniformity of the sintered compact was satisfactory when the molar ratio y was 0.016 or less. However, when the molar ratio y exceeded 0.016, the linear transparency increased but abnormal grain growth of crystal grains in the sintered compacts was observed and the generation of microcracks was observed in some areas, when the molar ratio y was 0.016 or less, as shown in sample Nos. 8 to 10 and sample Nos. 17 to 19.

Accordingly, it was confirmed that the molar ratio y is preferably 0.016 or less, from the standpoint of suppressing abnormal grain growth of crystal grains.

Example 2

To examine the effect of addition of $SnO_2$, 0.29 parts by weight of $SnO_2$ was added to 100 parts by weight of each of the samples of Example 1.

Specifically, first, calcined powders were prepared by the same method as in Example 1. Subsequently, $SnO_2$ was weighed so that the content of $SnO_2$ was 0.29 parts by weight relative to 100 parts by weight of each of the calcined powders. Purified water and an organic binder containing vinyl acetate were then mixed with each of the calcined powders and $SnO_2$. The resulting mixtures were then dried and granulated. Subsequently, samples having sample Nos. 21 to 39 were prepared by the same method and procedure as in Example 1.

As in Example 1, the states of the sintered compacts and the crystal phases, and the linear transparencies of sample Nos. 21 to 39 were measured.

Table 2 shows the compositions and the measurement results of sample Nos. 21 to 39.

TABLE 2

Main component: $(Sr_{0.75}Ba_{0.25})(Nb_{1-y}M_y)_{1.90}O_w$

| Sample No. | M | y | SnO$_2$ (parts by weight) | State of sintered compact | State of crystal phase | Linear transparency (%) |
|---|---|---|---|---|---|---|
| 21* | — | 0.000 | 0.29 | Sintering was insufficient. | In addition to a tetragonal crystal, a different phase of an orthorhombic crystal was also present. | 0.00 |
| 22 | Mg | 0.004 | 0.29 | The uniformity was satisfactory. | Single phase of a tetragonal crystal | 2.24 |
| 23 | Mg | 0.008 | 0.29 | The uniformity was satisfactory. | Single phase of a tetragonal crystal | 3.19 |
| 24 | Mg | 0.010 | 0.29 | The uniformity was satisfactory. | Single phase of a tetragonal crystal | 4.16 |
| 25 | Mg | 0.012 | 0.29 | The uniformity was satisfactory. | Single phase of a tetragonal crystal | 31.70 |
| 26 | Mg | 0.014 | 0.29 | The uniformity was satisfactory. | Single phase of a tetragonal crystal | 67.00 |
| 27 | Mg | 0.016 | 0.29 | The uniformity was satisfactory. | Single phase of a tetragonal crystal | 70.30 |
| 28 | Mg | 0.018 | 0.29 | Abnormal grain growth was observed. | Single phase of a tetragonal crystal | 69.20 |
| 29 | Mg | 0.020 | 0.29 | Abnormal grain growth was observed. | Single phase of a tetragonal crystal | 71.40 |
| 30 | Mg | 0.030 | 0.29 | Abnormal grain growth was observed. | Single phase of a tetragonal crystal | 72.50 |
| 31 | Zn | 0.004 | 0.29 | The uniformity was satisfactory. | Single phase of a tetragonal crystal | 4.41 |
| 32 | Zn | 0.008 | 0.29 | The uniformity was satisfactory. | Single phase of a tetragonal crystal | 6.28 |
| 33 | Zn | 0.010 | 0.29 | The uniformity was satisfactory. | Single phase of a tetragonal crystal | 8.20 |
| 34 | Zn | 0.012 | 0.29 | The uniformity was satisfactory. | Single phase of a tetragonal crystal | 62.40 |
| 35 | Zn | 0.014 | 0.29 | The uniformity was satisfactory. | Single phase of a tetragonal crystal | 72.00 |
| 36 | Zn | 0.016 | 0.29 | The uniformity was satisfactory. | Single phase of a tetragonal crystal | 69.60 |
| 37 | Zn | 0.018 | 0.29 | Abnormal grain growth was observed. | Single phase of a tetragonal crystal | 70.20 |
| 38 | Zn | 0.020 | 0.29 | Abnormal grain growth was observed. | Single phase of a tetragonal crystal | 71.10 |
| 39 | Zn | 0.030 | 0.29 | Abnormal grain growth was observed. | Single phase of a tetragonal crystal | 73.00 |

The sample marked with symbol * is out of the range of the present invention.

In sample No. 21, the Nb site contained neither Zn nor Mg in the form of a solid solution. Accordingly, the sinterability was not improved even when SnO$_2$ was added. In addition to a tetragonal crystal, the presence of a different phase of an orthorhombic crystal was observed. Therefore, translucency was not exhibited, and the linear transparency was "zero".

In contrast, it was found that the linear transparencies of sample Nos. 22 to 39 were improved compared with those of sample Nos. 2 to 19 to which SnO$_2$ was not added. For example, the linear transparency of sample No. 6 was 0.33%, whereas the linear transparency of sample No. 26, which had the same composition of the main component as that of sample No. 6, was 67.00%. Accordingly, it was found that the linear transparency was markedly improved by adding SnO$_2$. Similarly, the linear transparency of sample No. 15 was 3.45%, whereas the linear transparency of sample No. 35, which had the same composition of the main component as that of sample No. 15, was 72.00%. Accordingly, it was found that the linear transparency was markedly improved by adding SnO$_2$.

However, as is apparent from sample Nos. 28 to 30 and sample Nos. 37 to 39, when the molar ratio y of Mg or Zn exceeded 0.016, the linear transparency increased but abnormal grain growth of crystal grains in the sintered compacts was observed and the generation of microcracks was observed in some areas, as in [Example 1].

Next, the wavelength dependences of the linear transparencies of sample Nos. 26 and 35 were measured.

Figure 2:
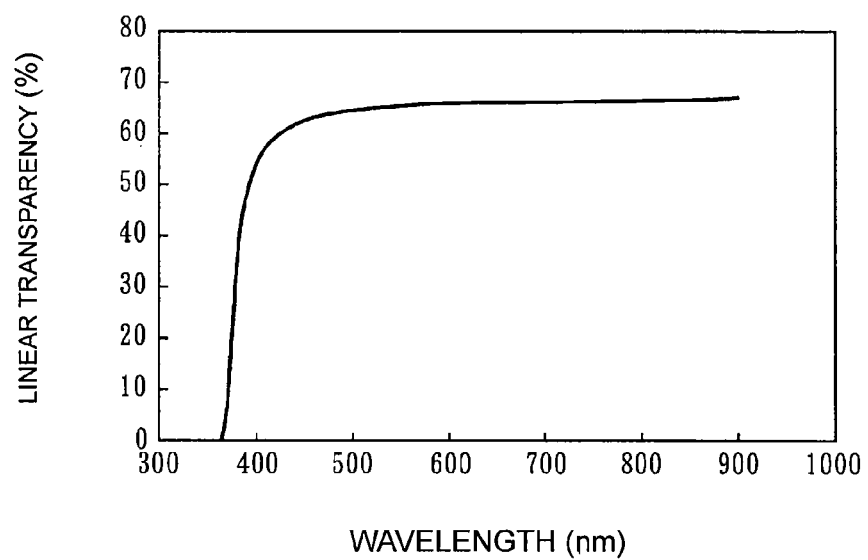
FIG. 2 is a characteristic diagram showing the wavelength dependence of the linear transparency in sample No. 26 of Example 2.
Figure 3:
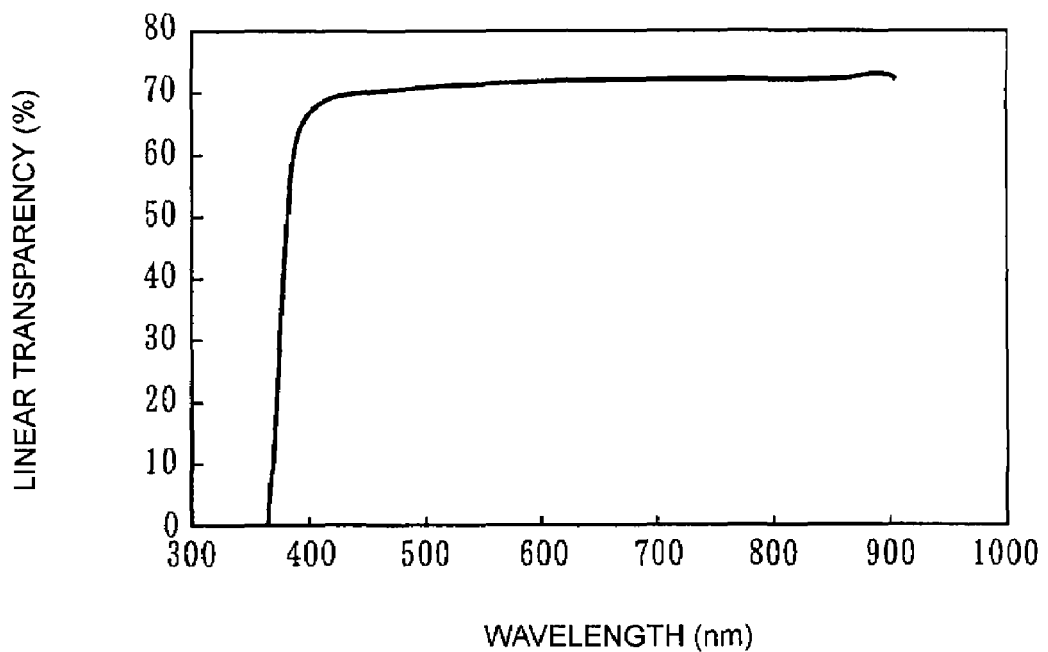
FIG. 3 is a characteristic diagram showing the wavelength dependence of the linear transparency in sample No. 35 of Example 2. This sample is a translucent ceramic of the present invention.

FIG. 2 shows the wavelength dependence of the linear transparency in sample No. 26, and FIG. 3 shows the wavelength dependence of the linear transparency in sample No. 35. In FIGS. 2 and 3, the horizontal axis represents the wavelength (nm), and the vertical axis represents the linear transparency (%).

As is apparent from FIGS. 2 and 3, it was confirmed that a substantially constant high linear transparency could be obtained over the wide visible light wavelength range of 400 to 900 nm.

Example 3

High-purity SrCO$_3$, BaCO$_3$, Na$_2$C$_2$O$_4$, Nb$_2$O$_5$, MgCO$_3$, and ZnO were prepared as ceramic raw materials used as starting raw materials.

Subsequently, the ceramic raw materials were weighed so that the composition of a main component was $\{(Sr_{1-x}Ba_x)_{0.98}Na_{0.02}\}(Nb_{0.986}M_{0.014})_{1.90}O_w$ (wherein M represents Mg or Zn, x satisfies the relationship $0.25 \leqq x \leqq 0.50$, and w is about 6), and charged in a ball mill. The ceramic raw materials were then mixed by a wet method to prepare mixtures. Each of the mixtures was dried, and then calcined at a temperature of 1,200° C. for three hours to prepare calcined powders.

Next, $SnO_2$ was weighed so that the content of $SnO_2$ was 0.29 parts by weight relative to 100 parts by weight of each of the calcined powders. Subsequently, purified water and an organic binder containing vinyl acetate were mixed with each of the resulting calcined powders and $SnO_2$. The resulting mixtures were then dried and granulated. Subsequently, samples having sample Nos. 41 to 52 were prepared by the same method and procedure as in Example 1.

Subsequently, the states of the sintered compacts and the crystal phases, and the linear transparencies were measured using the samples having sample Nos. 41 to 52, as in Example 1.

Table 3 shows the compositions and the measurement results of sample Nos. 41 to 52.

Figure 4:
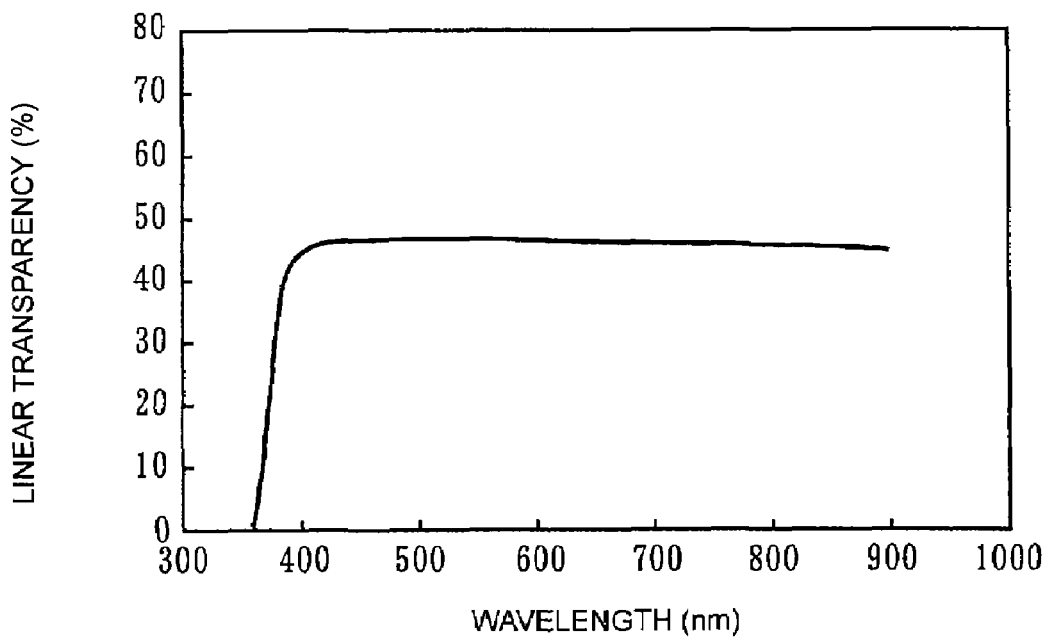
FIG. 4 is a characteristic diagram showing the wavelength dependence of the linear transparency in sample No. 46 of Example 3. This sample is a translucent ceramic of the present invention.
Figure 5:
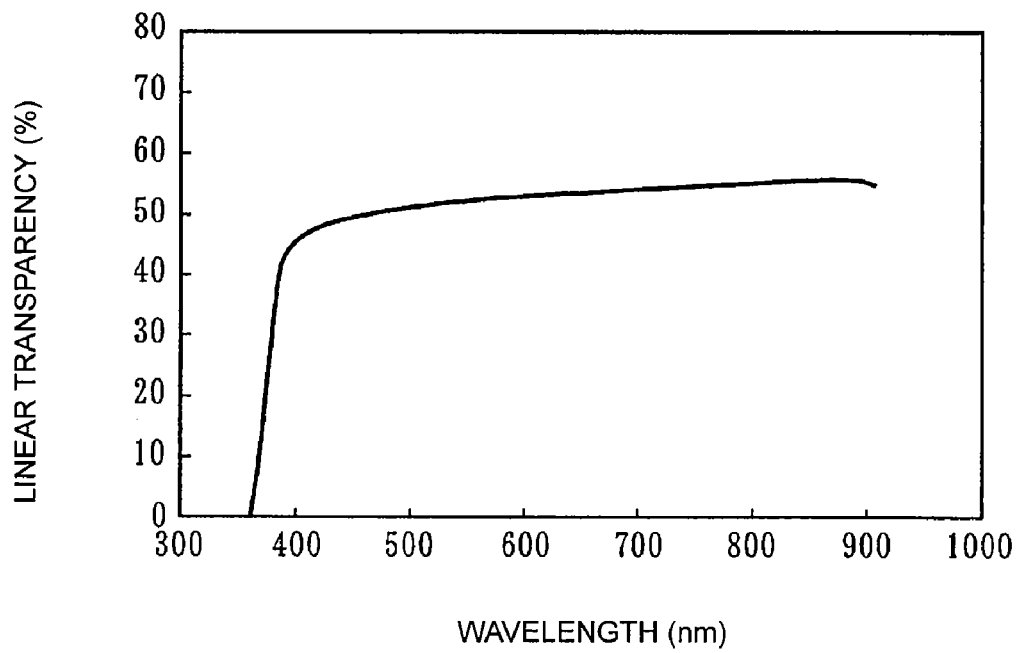
FIG. 5 is a characteristic diagram showing the wavelength dependence of the linear transparency in sample No. 52 of Example 3.

52. In FIGS. 4 and 5, the horizontal axis represents the wavelength (nm), and the vertical axis represents the linear transparency (%).

As is apparent from FIGS. 4 and 5, it was confirmed that a substantially constant high linear transparency could be obtained over the wide visible light wavelength range of 400 to 900 nm.

Example 4

The same ceramic raw materials as those in Example 3 were prepared, and the ceramic raw materials were weighed so that the composition of a main component was $\{(Sr_{0.75}Ba_{0.25})_{1-z}Na_z\}(Nb_{0.986}M_{0.014})_{1.90}O_w$ (wherein M represents Mg or Zn, z satisfies the relationship $0.01 \leqq x \leqq 0.30$, and w is about 6). Next, the weighed raw materials were charged in a ball mill and mixed by a wet method. Each of the resulting mixtures was dried, and then calcined at a temperature of 1,200° C. for three hours to prepare calcined powders.

Next, $SnO_2$ was weighed so that the content of $SnO_2$ was 0.29 parts by weight relative to 100 parts by weight of each of the calcined powders. Subsequently, purified water and an

TABLE 3

| Sample No. | Main component: $\{(Sr_{1-x}Ba_x)_{0.98}Na_{0.02}\}(Nb_{0.986}M_{0.014})_{1.90}O_w$ | | $SnO_2$ (parts by weight) | State of sintered compact | State of crystal phase | Linear transparency (%) |
|---|---|---|---|---|---|---|
| | x | M | | | | |
| 41 | 0.50 | Mg | 0.29 | The uniformity was satisfactory. | Single phase of a tetragonal crystal | 42.50 |
| 42 | 0.45 | Mg | 0.29 | The uniformity was satisfactory. | Single phase of a tetragonal crystal | 42.80 |
| 43 | 0.40 | Mg | 0.29 | The uniformity was satisfactory. | Single phase of a tetragonal crystal | 44.30 |
| 44 | 0.35 | Mg | 0.29 | The uniformity was satisfactory. | Single phase of a tetragonal crystal | 41.80 |
| 45 | 0.30 | Mg | 0.29 | The uniformity was satisfactory. | Single phase of a tetragonal crystal | 43.80 |
| 46 | 0.25 | Mg | 0.29 | The uniformity was satisfactory. | Single phase of a tetragonal crystal | 44.70 |
| 47 | 0.50 | Zn | 0.29 | The uniformity was satisfactory. | Single phase of a tetragonal crystal | 52.70 |
| 48 | 0.45 | Zn | 0.29 | The uniformity was satisfactory. | Single phase of a tetragonal crystal | 53.10 |
| 49 | 0.40 | Zn | 0.29 | The uniformity was satisfactory. | Single phase of a tetragonal crystal | 54.90 |
| 50 | 0.35 | Zn | 0.29 | The uniformity was satisfactory. | Single phase of a tetragonal crystal | 51.80 |
| 51 | 0.30 | Zn | 0.29 | The uniformity was satisfactory. | Single phase of a tetragonal crystal | 54.30 |
| 52 | 0.25 | Zn | 0.29 | The uniformity was satisfactory. | Single phase of a tetragonal crystal | 55.50 |

As is apparent from sample Nos. 41 to 52, when the molar ratio x of Ba in the (Sr, Ba) site was in the range of to 0.50, structural defects such as a void or abnormal grain growth were not observed, and the uniformity was satisfactory in all the sintered compact samples. The crystal phase of these samples was a single phase of a tetragonal crystal, and no different phase was formed. Linear transparencies in the range of 42.50% to 55.50% were obtained.

Next, the wavelength dependences of the linear transparencies of sample Nos. 46 and 52 were measured.

FIG. 4 shows the wavelength dependence of the linear transparency in sample No. 46, and FIG. 5 shows the wavelength dependence of the linear transparency in sample No.

organic binder containing vinyl acetate were mixed with each of the resulting calcined powders and $SnO_2$. The resulting mixtures were then dried and granulated. Subsequently, sample Nos. 61 to 72 were prepared by the same method and procedure as in Example 1.

Subsequently, as in Example 1, the states of the sintered compacts and the crystal phases, and the linear transparencies were measured using the samples having sample Nos. 61 to 72.

Table 4 shows the compositions and the measurement results of sample Nos. 61 to 72.

TABLE 4

| Sample No. | Main component: ${(Sr_{0.75}Ba_{0.25})_{1-z}Na_z}(Nb_{0.986}M_{0.014})_{1.90}O_w$ | | SnO$_2$ (parts by weight) | State of sintered compact | State of crystal phase | Linear transparency (%) |
| --- | --- | --- | --- | --- | --- | --- |
|  | M | Z |  |  |  |  |
| 61 | Mg | 0.01 | 0.29 | The uniformity was satisfactory. | Single phase of a tetragonal crystal | 40.60 |
| 62 | Mg | 0.03 | 0.29 | The uniformity was satisfactory. | Single phase of a tetragonal crystal | 32.90 |
| 63 | Mg | 0.05 | 0.29 | The uniformity was satisfactory. | Single phase of a tetragonal crystal | 37.30 |
| 64 | Mg | 0.10 | 0.29 | The uniformity was satisfactory. | Single phase of a tetragonal crystal | 34.20 |
| 65* | Mg | 0.20 | 0.29 | Abnormal grain growth was observed. | In addition to a tetragonal crystal, a different phase was partly present. | 0.00 |
| 66* | Mg | 0.30 | 0.29 | Abnormal grain growth was observed. | In addition to a tetragonal crystal, a different phase was partly present. | 0.00 |
| 67 | Zn | 0.01 | 0.29 | The uniformity was satisfactory. | Single phase of a tetragonal crystal | 25.20 |
| 68 | Zn | 0.03 | 0.29 | The uniformity was satisfactory. | Single phase of a tetragonal crystal | 40.40 |
| 69 | Zn | 0.05 | 0.29 | The uniformity was satisfactory. | Single phase of a tetragonal crystal | 32.30 |
| 70 | Zn | 0.10 | 0.29 | The uniformity was satisfactory. | Single phase of a tetragonal crystal | 35.30 |
| 71* | Zn | 0.20 | 0.29 | Abnormal grain growth was observed. | In addition to a tetragonal crystal, a different phase was partly present. | 0.00 |
| 72* | Zn | 0.30 | 0.29 | Abnormal grain growth was observed. | In addition to a tetragonal crystal, a different phase was partly present. | 0.00 |

The samples marked with symbol * are out of the range of the present invention.

In sample Nos. 65 and 71, the molar ratio z of Na in the (Sr, Ba) site was 0.20. More specifically, each of the samples contained 25 parts by mole of Na relative to 100 parts by mole of the sum of Sr and Ba. Accordingly, the molar content of Na was excessive, and thus, grain growth was excessively accelerated and the occurrence of abnormal grain growth was confirmed. Furthermore, regarding the state of the crystal phase, a different phase of an orthorhombic crystal was present in addition to a tetragonal crystal. Therefore, translucency was not exhibited, and the linear transparency was "zero".

In sample Nos. 66 and 72, the molar ratio z of Na in the (Sr, Ba) site was 0.30. More specifically, each of the samples contained about 43 parts by mole of Na relative to 100 parts by mole of the sum of Sr and Ba. Accordingly, the molar content of Na was excessive, and, as in samples Nos. 65 and 71, the occurrence of abnormal grain growth was confirmed. Furthermore, a different phase component, of an orthorhombic crystal, was also observed. Therefore, translucency was not exhibited, and the linear transparency was "zero".

In contrast, the molar ratio z of Na in the (Sr, Ba) site was in the range of 0.01 to 0.10 in sample Nos. 61 to 64 and sample Nos. 67 to 70. More specifically, the molar content of Na was in the range of about 1 to 11 parts by mole relative to 100 parts by mole of the sum of Sr and Ba. Abnormal grain growth did not occur, and the crystal phase was composed of a single phase of a tetragonal crystal. Consequently, linear transparencies in the range of 25.20% to 40.60% could be obtained.

Accordingly, it was confirmed that the amount of Na must be less than 25 parts by mole relative to 100 parts by mole of the sum of Sr and Ba, in the case where the (Sr, Ba) site contains Na in the form of a solid solution.

Example 5

High-purity SrCO$_3$, BaCO$_3$, La (OH)$_3$, Nb$_2$O$_5$, MgCO$_3$, and ZnO were prepared as ceramic raw materials to be used as starting raw materials.

Subsequently, the ceramic raw materials were weighed so that the composition of a main component was ${(Sr_{0.75}Ba_{0.25})_{1-u}La_u}(Nb_{0.986}M_{0.014})$ 1.90O$_w$ (wherein M represents Mg or Zn, u satisfies the relationship $0.01 \leq u \leq 0.10$, and w is about 6), and charged in a ball mill. The ceramic raw materials were then mixed by a wet method to prepare mixtures. Each of the mixtures was dried, and then calcined at a temperature of 1,200° C. for three hours to prepare calcined powders.

Next, SnO$_2$ was weighed so that the content of SnO$_2$ was 0.29 parts by weight relative to 100 parts by weight of each of the calcined powders. Subsequently, purified water and an organic binder containing vinyl acetate were mixed with each of the resulting calcined powders and $SnO_2$. The resulting mixtures were then dried and granulated. Subsequently, sample Nos. 81 to 92 were prepared by the same method and procedure as in Example 1.

Subsequently, as in Example 1, the states of the crystal phases and the sintered compacts, and the linear transparencies were measured using sample Nos. 81 to 92.

Table 5 shows the compositions and the measurement results of sample Nos. 81 to 92.

0.77% or more could be obtained, and thus, it was confirmed that translucency could be ensured.

Accordingly, it was confirmed that the amount of La must be less than 11 parts by mole relative to 100 parts by mole of the sum of Sr and Ba in the case where the (Sr, Ba) site contains La in the form of a solid solution.

Next, the wavelength dependences of the linear transparencies of sample Nos. 82 and 88 were measured.

TABLE 5

| | Main component: $\{(Sr_{0.75}Ba_{0.25})_{1-u}La_u\}(Nb_{0.986}M_{0.014})_{1.90}O_w$ | | | | | |
|---|---|---|---|---|---|---|
| Sample No. | M | u | $SnO_2$ (parts by weight) | State of sintered compact | State of crystal phase | Linear transparency (%) |
| 81 | Mg | 0.01 | 0.29 | The uniformity was satisfactory. | Single phase of a tetragonal crystal | 9.46 |
| 82 | Mg | 0.02 | 0.29 | The uniformity was satisfactory. | Single phase of a tetragonal crystal | 72.00 |
| 83 | Mg | 0.04 | 0.29 | The uniformity was satisfactory. | Single phase of a tetragonal crystal | 64.30 |
| 84 | Mg | 0.06 | 0.29 | The uniformity was satisfactory. | Single phase of a tetragonal crystal | 1.31 |
| 85 | Mg | 0.08 | 0.29 | The uniformity was satisfactory. | Single phase of a tetragonal crystal | 0.65 |
| 86* | Mg | 0.10 | 0.29 | Abnormal grain growth was observed. | In addition to a tetragonal crystal, a different phase was partly present. | 0.00 |
| 87 | Zn | 0.01 | 0.29 | The uniformity was satisfactory. | Single phase of a tetragonal crystal | 11.40 |
| 88 | Zn | 0.02 | 0.29 | The uniformity was satisfactory. | Single phase of a tetragonal crystal | 73.50 |
| 89 | Zn | 0.04 | 0.29 | The uniformity was satisfactory. | Single phase of a tetragonal crystal | 77.20 |
| 90 | Zn | 0.06 | 0.29 | The uniformity was satisfactory. | Single phase of a tetragonal crystal | 1.56 |
| 91 | Zn | 0.08 | 0.29 | The uniformity was satisfactory. | Single phase of a tetragonal crystal | 0.77 |
| 92* | Zn | 0.10 | 0.29 | Abnormal grain growth was observed. | In addition to a tetragonal crystal, a different phase was partly present. | 0.00 |

The samples marked with symbol * are out of the range of the present invention.

In sample Nos. 86 and 92, the molar ratio u of La in the (Sr, Ba) site was 0.10. More specifically, each of the samples contained 11 parts by mole of La relative to 100 parts by mole of the sum of Sr and Ba. Accordingly, the molar content of La was excessive, and thus, grain growth was excessively accelerated and the occurrence of abnormal grain growth was confirmed. Furthermore, in addition to a tetragonal crystal, a different phase of an orthorhombic crystal was present. Therefore, translucency was not exhibited, and the linear transparency was "zero".

Figure 6:
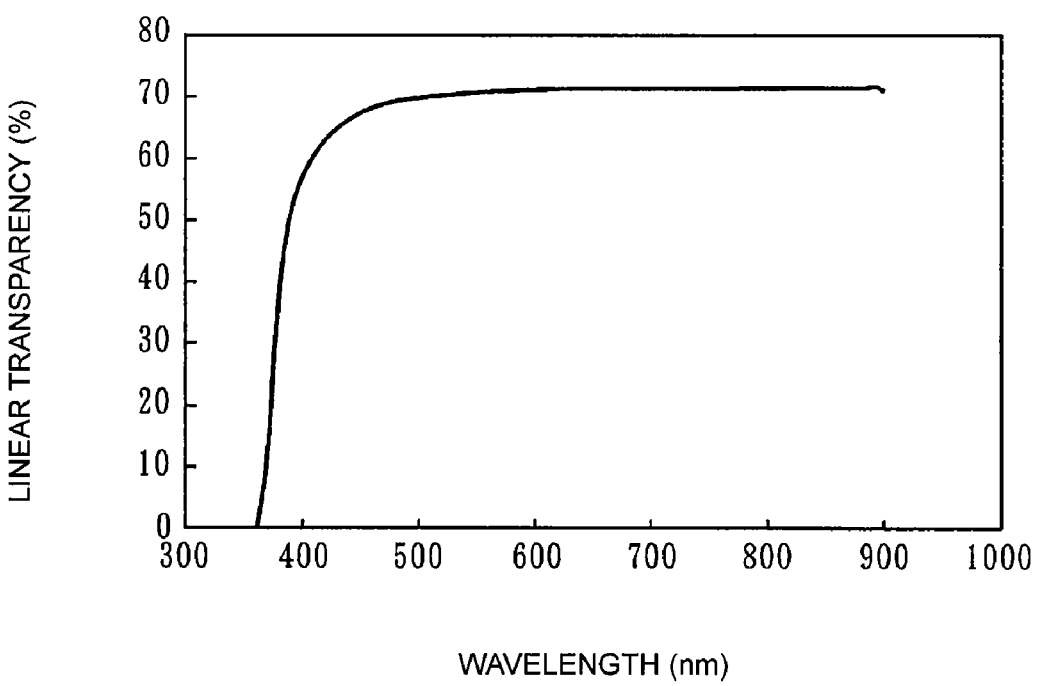
FIG. 6 is a characteristic diagram showing the wavelength dependence of the linear transparency in sample No. 82 of Example 5.
Figure 7:
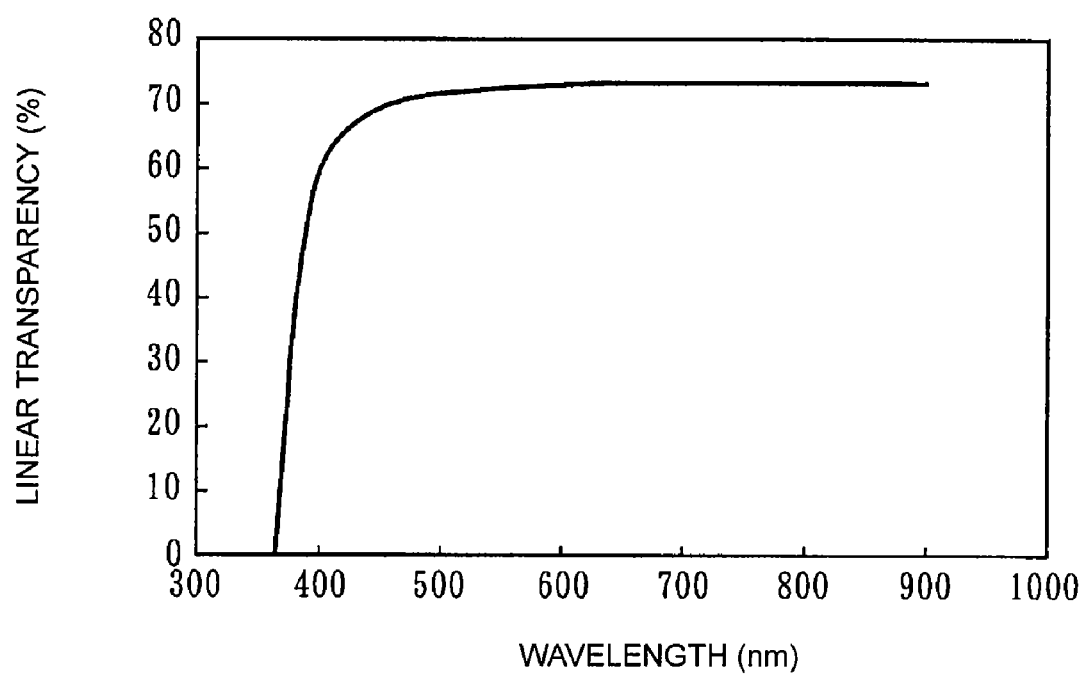
FIG. 7 is a characteristic diagram showing the wavelength dependence of the linear transparency in sample No. 88 of [Example 5].

In contrast, the molar ratio u of La in the (Sr, Ba) site was in the range of 0.01 to 0.08 in sample Nos. 81 to 85 and sample Nos. 87 to 91. More specifically, the molar content of La was in the range of about 1.01 to 8.7 parts by mole relative to 100 parts by mole of the sum of Sr and Ba. Abnormal grain growth did not occur, and the crystal phase was composed of a single phase of a tetragonal crystal. Thereby, linear transparencies of FIG. 6 shows the wavelength dependence of the linear transparency in sample No. 82, and FIG. 7 shows the wavelength dependence of the linear transparency in sample No. 88. In FIGS. 6 and 7, the horizontal axis represents the wavelength (nm), and the vertical axis represents the linear transparency (%).

As is apparent from FIGS. 6 and 7, it was confirmed that a substantially constant high linear transparency could be obtained over the wide visible light wavelength range of 400 to 900 nm.

Example 6

High-purity $SrCO_3$, $BaCO_3$, $Na_2C_2O_4$, $Nb_2O_5$, and ZnO were prepared as ceramic raw materials to be used as starting raw materials.

Subsequently, weights of the ceramic raw materials were taken so that the composition of a main component was $\{(Sr_{0.75}Ba_{0.25})_{0.96}Na_{0.04}\}(Nb_{0.994}M_{0.006})_{1.90}O_w$ (wherein w is about 6), and charged in a ball mill. The ceramic raw materials were then mixed by a wet method to prepare a mixture. The mixture was dried, and then calcined at a temperature of 1,200° C. for three hours to prepare a calcined powder.

Next, $SnO_2$ was weighed so that the content of $SnO_2$ was in the range of 0.00 to 0.58 parts by weight relative to 100 parts by weight of the calcined powder. Subsequently, purified water and an organic binder containing vinyl acetate were mixed with the resulting calcined powder and $SnO_2$. The resulting mixtures were then dried and granulated. Subsequently, sample Nos. 101 to 104 were prepared by the same method and procedure as in Example 1.

Subsequently, as in Example 1, the states of the crystal phases and the sintered compacts, and the linear transparencies were measured using the samples having sample Nos. 101 to 104.

Table 6 shows the compositions and the measurement results of sample Nos. 101 to 104.

TABLE 6

| Sample No. | Main component: $\{(Sr_{0.75}Ba_{0.25})_{0.96}Na_{0.04}(Nb_{0.994}Zn_{0.006})_{1.90}O_w$ $SnO_2$ (parts by weight) | State of sintered compact | State of crystal phase | Linear transparency (%) |
|---|---|---|---|---|
| 101* | 0.00 | The uniformity was satisfactory. | Single phase of a tetragonal crystal | 33.90 |
| 102 | 0.15 | The uniformity was satisfactory. | Single phase of a tetragonal crystal | 71.60 |
| 103 | 0.29 | The uniformity was satisfactory. | Single phase of a tetragonal crystal | 71.90 |
| 104 | 0.58 | Abnormal grain growth was observed. | Single phase of a tetragonal crystal | 34.20 |

The sample marked with symbol * is out of the range of the present invention.

As is apparent from a comparison between sample No. 101 and sample Nos. 102 to 104, it was found that by adding $SnO_2$ to the main component, the translucency was improved, and more satisfactory liner transparencies could be obtained.

However, the content of $SnO_2$ was 0.58 parts by weight relative to 100 parts by weight of the main component in sample No. 104, and the amount of $SnO_2$ added was excessive. Therefore, although the crystal phase was composed of a single phase of a tetragonal crystal, abnormal grain growth of crystal grains was observed, and the linear transparency also tended to decrease.

Accordingly, it is preferable that 0.15 parts by weight or more of $SnO_2$ is added to 100 parts by weight of the main component in order to exhibit the effect of addition of $SnO_2$. In such a case, however, from the standpoint of suppressing abnormal grain growth, the amount of $SnO_2$ added is preferably less than 0.58 parts by weight relative to 100 parts by weight of the main component.

The invention claimed is:

1. A translucent ceramic comprising a main component composed of a tungsten-bronze-type compound represented by a general formula $\{(Sr, Ba)Nb_vO_w\}$ wherein $1.8 \leq v \leq 2.2$ and w represents a positive number maintaining electrical neutrality in which some Nb atoms are replaced with atoms of at least one element M selected from the group consisting of Zn and Mg such that the replacement ratio is 0.004 or more in terms of the molar ratio, and at least one of Sn and Bi in an amount of 0.15 parts by weight or more in terms of $SnO_2$ and $Bi_2O_3$, respectively, relative to 100 parts by weight of the main component.

2. The translucent ceramic according to claim 1, wherein the molar ratio of Ba in the (Sr, Ba) site is in the range of 0.25 to 0.50.

3. The translucent ceramic according to claim 2, further having Na in an amount of less than 25 parts by mole relative to 100 parts by mole of the sum of Sr and Ba.

4. A translucent ceramic comprising a main component composed of a tungsten-bronze-type compound represented by a general formula $\{(Sr, Ba)Nb_vO_w\}$ wherein $1.8 \leq v \leq 2.2$, the molar ratio of Ba in the (Sr, Ba) site is in the range of 0.25 to 0.50, w represents a positive number maintaining electrical neutrality, and in which some Nb atoms are replaced with atoms of at least one element M selected from the group consisting of Zn and Mg such that the replacement ratio is 0.004 or more in terms of the molar ratio, at least one of Sn and Bi in an amount of 0.15 parts by weight or more in terms of $SnO_2$ and $Bi_2O_3$, respectively, relative to 100 parts by weight of the main component, and in an amount of less than 11 parts by mole relative to 100 parts by mole of the sum of Sr and Ba.

5. The translucent ceramic according to claim 1, further having Na in an amount of less than 25 parts by mole relative to 100 parts by mole of the sum of Sr and Ba.

6. A translucent ceramic comprising a main component composed of a tungsten-bronze-type compound represented by a general formula $(Sr_{1-x}Ba_x)(Nb_{1-y}M_y)_vO_w$ wherein M is at least one of Zn and Mg, $0.25 \leq x \leq 0.50$, $0.004 \leq y \leq 0.16$, $1.8 \leq v \leq 2.2$ and w represents a positive number maintaining electrical neutrality, and further comprising at least one of Sn and Bi in an amount of 0.15 to 0.58 parts by weight in terms of $SnO_2$ and $Bi_2O_3$, respectively, relative to 100 parts by weight of the main component.

7. A translucent ceramic comprising a main component composed of a tungsten-bronze-type compound represented by a general formula $(Sr_{1-x}Ba_x)(Nb_{1-y}M_y)_vO_w$ wherein M is at least one of Zn and Mg, $0.25 \leq x \leq 0.50$, $0.004 \leq y \leq 0.16$, $1.8 \leq v \leq 2.2$ and w represents a positive number maintaining electrical neutrality, and further having La present in an amount of less than 11 parts by mole relative to 100 parts by mole of the sum of Sr and Ba.

8. The translucent ceramic according to claim 6, further having Na present in an amount of less than 25 parts by mole relative to 100 parts by mole of the sum of Sr and Ba.

9. The translucent ceramic according to claim 6, in, which the at least one of Sn and Bi is $SnO_2$.

10. An electro-optical component comprising the translucent ceramic according to claim 9.

11. An electro-optical component comprising the translucent ceramic according to claim 8.

12. An electro-optical component comprising the translucent ceramic according to claim 6.

13. An electro-optical component comprising the translucent ceramic according to claim 4.

14. An electro-optical component comprising the translucent ceramic according to claim 3.

15. An electro-optical component comprising the translucent ceramic according to claim 2.

16. An electro-optical component comprising the translucent ceramic according to claim 7.

17. An electro-optical component comprising the translucent ceramic according to claim 1.

18. An electro-optical component comprising the translucent ceramic according to claim 5.

* * * * *